Patented Dec. 12, 1950

2,533,301

UNITED STATES PATENT OFFICE 2,533,301

PREVENTION OF RUST

Franklin M. Watkins, Flossmoor, Ill., assignor to Sinclair Refining Company, New York, N. Y., a corporation of Maine No Drawing. Application September 26, 1947, Serial No. 776,415

7 Claims. (Cl. 44—74)

My invention is concerned with a method for preventing or retarding rusting, especially rusting due to water dissolved or entrained in or settled from petroleum oils, including especially gasoline, kerosene and fuel oils. The method is particularly valuable as applied to prevent rusting in pipe lines.

Rust frequently occurs in pipe lines, storage tanks, etc. and even in automotive and similar equipment because of traces of moisture inevitably present in the fuel or lubricant. Gasoline and kerosene, for example, as they leave the refinery are usually free of occluded moisture but they may contain as much as 0.005–0.01% dissolved moisture. Part of this dissolved moisture separates when the oil is chilled in a storage tank, for instance, and settles as a separate liquid phase beneath the main body of the oil.

Water may also enter oil handling systems along with air through partially filled tanks provided with breather devices. As such a tank cools, for example at night, the contents contract and air laden with moisture enters. This moisture condenses on the walls of the tank, settles to the bottom and dried air is expelled when the contents of the tank again warm up as from the heat of the sun the next day. As will be readily appreciated, repetition of this cycle eventually leaves appreciable amounts of water at the bottom of the tank.

Although several methods have been proposed for preventing rusting in product handling systems, each of these has rather obvious shortcomings. One method, for example, involves drying of the product, as gasoline, by absorption on dehydrated alumina before the product is pumped into pipe lines. Another method involves the introduction into the product of costly chemicals such as hydrogen or mercapto benzothiazole which react with dissolved oxygen and thereby arrest corrosion. Still another method involves the introduction of water soluble corrosion inhibitors such as sodium nitrite or chromates. Each of these methods is disadvantageous as affording only temporary protection. Sodium nitrite applied to inhibit rusting in pipe lines is frequently decomposed by the action of oxidizing agents present in some crude oils. Hydrogen is quickly lost from vented storage tanks while water soluble inhibitors are lost when they settle to the bottom of storage tanks and are drawn off. Completely water soluble inhibitors are further deficient in many instances in not affording protection in the oil phase.

The rust-inhibiting agent employed in the practice of my invention is inexpensive and readily prepared, is difficult to decompose and provides a high degree of protection in both the oil phase and aqueous phase. Moreover, it is effective in extremely small proportions and over a wide range of temperatures.

The agent to which I refer is monocyclohexylamine mahogany sulfonate. This material is produced by reaction of sulfuric acid-treated petroleum oil and cyclohexylamine, which itself may be readily produced by any one of several standard procedures well known in the art. In the reaction with the sulfuric acid-treated petroleum oil, the cyclohexylamine should preferably be used in approximately the quantity called for by theory as determined by the acid number of the acid oil. In a typical small scale preparation of a concentrate of the amine sulfonate, 100 grams of an acid-treated oil containing .0239 mole of sulfonic acid and 2.37 grams of cyclohexylamine are stirred for two hours during which period the temperature rises from about 80° F. to about 100° F. The reaction mixture is cleared of a slight haze by filtration and the filtrate diluted with neutral oil to give a blend analyzing about 10% sulfonate.

In such a run as above the acid oil reacted with the cyclohexylamine may test about as follows:

Gravity, °API_____ 29.4
Viscosity at 100° F. SUS_____ 205
Viscosity at 210° F. SUS_____ 47.2
Acid number_____ 13.4

This particular acid oil was prepared by treating a Mid-Continent neutral oil with successive dumps of oleum, a total of 150 pounds of oleum being used for each barrel of oil. Following removal of the separable sludge after the last dump of oleum, the acid oil was blown with air to remove $SO_2$ and settled to remove substantially the last trace of sludge.

As indicated, I customarily employ the amine sulfonate as a concentrate in the oil from which it was derived or in a blend produced by diluting such a concentrate with neutral oil. The amount of the sulfonate in the concentrate may vary within wide limits, but in testing the rust-inhibiting property of the sulfonate I have found the use of 10% concentrates advantageous.

Concentrates prepared as described find wide application. Thus, in addition to being useful in inhibiting rusting in storage tanks, pipe lines, etc., they may be blended with oils of suitable characteristics to provide lubricating compositions which will retard the corrosion of iron and steel surfaces with which they come into contact. In such an application, as little as 5 to as much as 400-500 pounds of a 10% concentrate may be used per 1,000 barrels of oil, the exact amount depending upon the degree of protection required and other factors including the extent of solubility of the sulfonate in the particular base oil, the viscosity of the base oil, etc. Highly effective slushing and needle oils can be prepared by blending concentrates with oils conventionally used in slushing and needle oil manufacture. Such oils are applied to clean metal surfaces as by spraying, brushing or dipping to protect the surface from corrosion by atmospheric moisture or accidental moisture spray. The formula of a typical lubricating composition which is also useful for slushing purposes is given below:

Base oil: Weight percent
- Mid-Continent neutral, vis. at 100° F.—100±secs. _____ 34.25
- Mid-Continent neutral, vis. at 100° F.—200±secs. _____ 19.00
- Mid-Continent aircraft lubricating oil 15.00
- Sulfonate concentrate (10% oil-free sulfonate) _____ 28.00
- Reaction product of turpentine and $P_2S_5$__ 2.40
- Reaction product of diamylphenol and $P_2O_5$ _____ 1.20
- Pour point depressor_____ .15

100.00

In this composition, the turpentine-$P_2S_5$ reaction product functions as an antioxidant and bearing corrosion inhibitor, while the reaction product of diamylphenol and $P_2O_5$ increases film strength and also supplements the rust-inhibiting action of the sulfonate. The rust-inhibiting action of the diamylphenol-$P_2O_5$ product is altogether different from that of the sulfonates. This product is quite effective in preventing rusting in salt spray but unlike the sulfonates it is ineffective under the conditions of the conventional humidity cabinet test. As the pour depressor in the composition any one of the several commercial products such as Santopour, for example, may be used.

Objects or articles susceptible to attack by moisture with resultant corrosion, and which may be treated with oil-base compositions prepared according to my invention include, for example, accurately machined parts such as piston rings, pump plungers, etc., castings such as steel castings, which are frequently stored in the open for long periods, idle machinery, storage drums, tools and the like.

I have found that the sulfonate concentrate is not satisfactory for use in turbine oils as an antirust agent because of the emulsifying properties of the sulfonate. These emulsifying properties, however, do not interfere with its use as a top cylinder lubricant or in automobile radiators, for example.

The suitability of the monocyclohexylamine mahogany sulfonate for rust-inihibiting compositions of various types is demonstrated by subjecting blends containing the sulfonate to a test analogous to A. S. T. M. designation D-665-42T. According to this test, as modified for my purposes, a polished mild steel strip is suspended in a beaker fitted with a mechanical stirrer and containing 350 mls. of the test blend. The blend is stirred for 30 minutes after which 50 mls. thereof is removed and 30 mls. of distilled water substituted. Stirring is continued for 48 hours and the strip then inspected for rust.

The appended table compares the effectiveness of monocyclohexylamine mahogany sulfonate in the described test with other amine mahogany sulfonates and representative metal mahogany sulfonates. In the tests of the table kerosene was employed as the inhibited oil.

Table

| Sulfonate | Additive Concentration, Lbs./1,000 Bbls.[1] | Rust Rating[2] |
|---|---|---|
| Blank | | E |
| *Amine sulfonates* | | |
| Cyclohexylamine sulfonate | 25 | A |
| Laurylamine sulfonate | 100 | C |
| Ethylamine sulfonate | 25 | B |
| Naphthenylamine sulfonate | 25 | D |
| Triamylamine sulfonate | 100 | B+ |
| Ethanolamine sulfonate | 18 | B |
| *Metal sulfonates* | | |
| Cadmium sulfonate | 36 | B |
| Calcium sulfonate (basic) | 25 | B |
| Cobaltous sulfonate | 25 | D |
| Manganese sulfonate | 25 | D |
| Nickel sulfonate | 25 | D |

[1] Of a concentrate containing 10% sulfonate.
[2] Rust rating:

A = no rust on strip.
B+ = up to 5% of surface rusted.
B = 5-25% of surface rusted.
C = 25-50% of surface rusted.
D = 50-75% of surface rusted.
E = 75-100% of surface rusted.

I claim:

1. The method of inhibiting the rusting of iron and steel surfaces which comprises maintaining a suitably concentrated petroleum oil distillate solution of cyclohexylamine mahogany sulfonate in contact with such surfaces, said petroleum oil distillate being selected from the group consisting of gasoline, kerosene and fuel oil.

2. A petroleum oil distillate base composition effective for retarding rusting of iron and steel surfaces which comprises cyclohexylamine mahogany sulfonate as an active rust-inhibiting component, said petroleum oil distillate being selected from the group consisting of gasoline, kerosene and fuel oil.

3. A petroleum oil distillate to which a rust-inhibiting property has been imparted by the incorporation of an effective concentration of cyclohexylamine mahogany sulfonate, said petroleum oil distillate being selected from the group consisting of gasoline, kerosene and fuel oil.

4. Gasoline to which a rust-inhibiting property has been imparted by the incorporation of an effective concentration of cyclohexylamine mahogany sulfonate.

5. Kerosene to which a rust-inhibiting property has been imparted by the incorporation of an effective concentration of cyclohaxylamine mahogany sulfonate.

6. Fuel oil to which a rust-inhibiting property has been imparted by the incorporation of an effective concentration of cyclohexylamine mahogany sulfonate.

7. Method of preventing the rusting of pipe lines, storage tanks, and other petroleum refinery equipment which comprises incorporating in the petroleum oil distillate introduced into the equipment an effective amount of cyclohexylamine mahogany sulfonate, said petroleum oil distillate being selected from the group consisting of gasoline, kerosene and fuel oil.

FRANKLIN M. WATKINS.

REFERENCES CITED

The following references are of record in the file of this patent:

UNITED STATES PATENTS

| Number | Name | Date |
|---|---|---|
| 2,060,138 | Taylor | Nov. 10, 1936 |
| 2,125,305 | Murphy | Aug. 2, 1938 |
| 2,333,206 | Sloan | Nov. 2, 1943 |
| 2,401,993 | Wasson et al. | June 11, 1946 |
| 2,412,634 | Schwartz | Dec. 17, 1946 |
| 2,444,970 | Zimmer et al. | July 13, 1948 |